Merriman & Ross,
Stone-Channeling Machine.

Nº 59,856. Patented Nov. 20, 1866.

United States Patent Office.

ANDREWS T. MERRIMAN, OF RUTLAND, VERMONT, AND THOMAS ROSS, OF MIDDLEBURY, VERMONT, ASSIGNORS TO MERRIMAN & ROSS, AFORESAID, AND J. B. REYNOLDS AND R. BARRETT, OF RUTLAND, VERMONT.

Letters Patent No. 59,856, dated November 20, 1866.

IMPROVED MACHINE FOR CHANNELLING STONES.

The Schedule referred to in these Letters Patent and making part of the same.

TO ALL WHOM IT MAY CONCERN:

Be it known that we, ANDREWS T. MERRIMAN, of Rutland, in the county of Rutland, and State of Vermont, and THOMAS ROSS, of Middlebury, in the county of Addison, and State of Vermont, have invented a new and useful improvement in Machines for Channelling Stones; and we do hereby declare that the following is a full, clear, and exact description thereof, which will enable others skilled in the art to make and use the same, reference being had to the accompanying drawings, forming part of the specification, in which—

Similar letters of reference indicate like parts.

Figure 1:
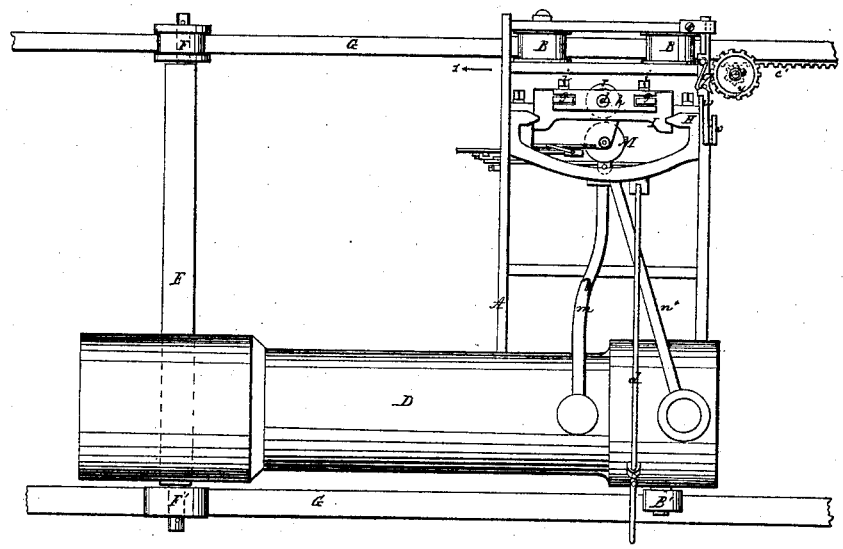
Figure 1 represents a plan or top view of this invention.
Figure 2:
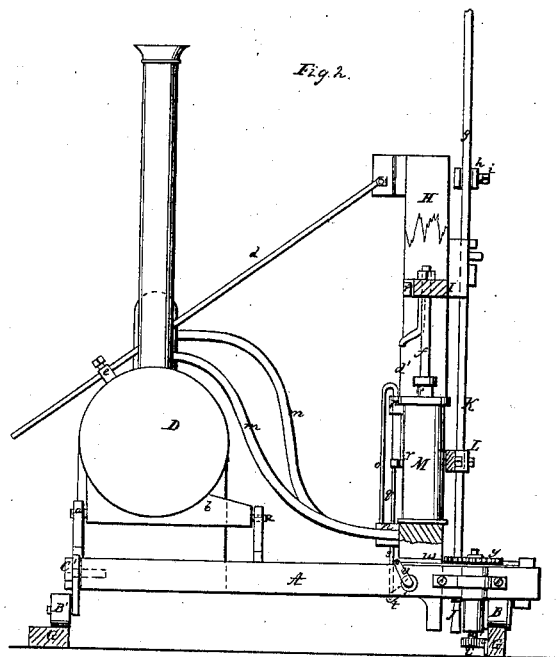
Figure 2 is a sectional end elevation of the same.

This invention consists in the combination of a steam-boiler and steam-cylinder with a gang of cutters and a suitable feed mechanism, in such a manner that said cutters are operated by the direct application of the steam, and the machine is complete as a whole, ready to be put up in any desired locality, and to be operated independent of any other mechanism or apparatus. It consists, further, in the arrangement of an automatic and adjustable valve gear, in combination with a gang of cutters, in such a manner that the valve is changed and the motion of the cutters reversed by the concussion of the cutters with the rock, and consequently the change of the valve is not made dependent on the stroke of the cutters; provision also being made for changing the valve when the piston reaches a point near the bottom of the cylinder, in case it is not previously reversed by the concussion of the cutters, thus avoiding the danger of the piston coming in contact with the lower cylinder-head in any case. It consists, further, in arranging the several cutters forming the gang with their cutting edges at unequal distances from each other. This causes them to cut the bottom of the channel smooth and even, whereas, if they were equidistant, there would be a tendency for them to cut in notches, an evil which grows more and more aggravated as the work progressed. The invention consists, further, in the arrangement of a rock-shaft, one end of which connects with a hinged lever and adjustable rod connected to the cross-head of the piston, whereas its other end carries a hinged sliding pawl, which engages with a ratchet-wheel mounted on the arbor of a feed-wheel, in such a manner that an automatic feed motion is obtained, whereby the truck carrying the boiler, engine, and cutters is made to travel in the desired direction over the rock to be channelled. The invention consists, finally, in the arrangement of the cutter-frame, which forms the guide for the cross-head of the steam-cylinder and the cutters or cutter-bar, in combination with the truck-frame and boiler, in such a manner that the said cutter-frame, with its appendages, can be inclined either forward or back a limited extent longitudinally or at an angle with the line of the track on which the whole apparatus moves, so that those cutters in the gang, which for the time being form the rear cutters, shall cut a little the deepest in the rock to be channelled.

A represents a truck, made of iron or any other suitable material, and supported by three wheels, B B* B', two of which are secured to axles which have their bearings in one side of the truck-frame, whereas the axle of the last wheel, B', is fastened in a slotted bracket, C, that is adjustable on the opposite side of the truck-frame. This adjustable bracket C serves the perpose of levelling the truck-frame, and renders it unnecessary to put down the two rails forming the track on the same plane whenever (as is often the case) it is inconvenient to do so. The axle of the wheel B* is arranged on a bracket similar to the bracket C, and, by adjusting this up or down, the truck-frame and standards, which carry the cutting apparatus, are inclined forward or backward for the purpose, as stated above, of causing the rear cutters of the gang to cut the deepest, each chisel or cutter cutting a little deeper than the one preceding it, whereas if all cut the same depth the forward cutters would have to do the greater part or nearly all the cutting. The end of the boiler D is supported on two standards on the truck-frame A, which form the bearings for trunnions $a$ $a$ on the axle or rock-shaft $b$, to which the boiler is secured. These trunnions permit the truck-frame A to adjust itself to the track on which it moves when the wheel B* is in any desired position. It would perhaps be quite as well to have the boiler firmly secured to the frame A, and also have the wheel B* without the adjustable bracket, but so attach the cutter-frame H to the truck-frame A that it can be inclined forward or backward.

The opposite end of the boiler D rests on an axle, E, which is secured in two wheels, F F'. The length of this axle is equal to the length of the truck-frame, or, in other words, the distance of the wheel F from the wheel F′, is equal to that of the wheels B B* from the wheel B′, so that the same can be made to run on a track, G. This track is composed of two rails, one of which may be simply a flat strip of iron, whereas the other is so shaped that it fits in between the two flanges of the wheels B B* F, or the track and wheels may be constructed in any suitable manner; said track is bolted down upon the surface of the rock to be channelled. From the truck rises the cutter frame H, which is bolted to said truck so that it can be brought in an upright or inclined position laterally; and a rod, $d$, which is hinged to the upper end of the cutter frame, and which passes through an eye-bolt $e$, secured in the boiler D, serves to adjust and retain said cutter frame in the desired position.

Figure 3:
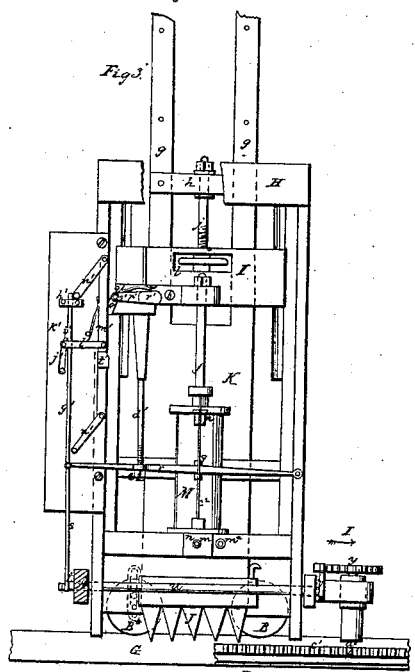
Figure 3 is a front elevation of the same.

The frame, H, forms the guide for the cross-head I, which is secured to the piston rod, $f$, and which transmits the motion of said piston rod to the gang of cutters, J. These cutters are secured in a socket at the lower end of the cutter bar K, which slides up and down with the cross-head I, being guided at its lower end by the slotted bar L, secured to the frame H, on which it may be moved downwards as the cutters penetrate the rock, so as to give the bar, K, support as near the cutters J as practicable. The upper portion of the bar, K, forms two shanks, $g$, which pass through the cross-head I, and which are connected to each other by a cross-piece, $h$, fastened to them by means of screws $i$, above the cross-head, and arranged so that it can be adjusted higher or lower on said shanks, according to the depth to which the cutters are expected to descend. In the cross-piece $h$ is secured the feed screw $j$, which passes down freely through a suitable hole in the cross-head, and screws in the hub of a hand wheel $k$, situated in a transverse slot, $l$, in the cross-head, as clearly shown in fig. 3. By turning the hand wheel $k$, the cutters can be raised or lowered nearly the whole length of the feed screw $j$, and if this length is not sufficient to reach the desired depth, the cross-piece $h$ is moved higher up in the shanks $g$, after a certain depth has been reached, and the operation is continued until the channel in the rock or stone has reached the required depth.

The piston rod, $f$, emanates from the steam cylinder M, to which steam is admitted from the boiler D, through a flexible pipe $m$. This pipe, $m$, may be wholly of flexible material, or the greater part of it, as well as the exhaust pipe, may be of such material as is ordinarily used for similar purposes, with flexible joints so that it will not interfere with the desired movements of the cutter frame H. The cylinder is secured in the cutter frame and swings back and forth with it. The steam pipe passes into a suitable valve chest, $n$, at or near the bottom of the cylinder, and an additional steam pipe, $o$, extends to the small steam cylinder P, at or near the top of the cylinder. Within this small cylinder, P, is a valve piston to which the valve rod, $q$, is attached, and when steam is admitted into the valve chest $n$, it at the same time passes by the pipe $o$, to the cylinder $p$, and acting on the valve piston would force the rod $q$, and steam valve in the valve chest $n$ down, thus opening the steam port and admitting steam under the piston of the cylinder M, were it not prevented from so doing by the automatic valve gearing which we will proceed to describe. Attached to the valve rod $q$, is a lever $r$, which has its fulcrum at one of the uprights of the cutter frame H, and its opposite end is connected to a bar, $g'$; this bar passes up through a suitable box or clasp $h'$, and it is provided with a projection or nose $i'$, which forms the bearing point for a stop pawl $j'$; said stop pawl is hinged to a plate $k'$, attached to one of the uprights of the cutter frame, and it connects by a link $l'$, with a parallel bar $m'$, which is connected to the plate $k'$ by links $n'$. This bar, $m'$, has a tendency by its own gravity, owing to the inclination of the links $n'$, to move inwards towards the middle of the cutter frame, (which tendency may be increased by a spring if necessary,) drawing with it by the link $l'$ the stop pawl $j'$, and holding it under the nose $i'$, of the bar $g'$; this prevents the opening of the steam valve in the steam chest $n$, and will do so until the stop pawl $j'$ lets go the nose $i'$ of the bar $g'$, attached to the cross-head I; and moving up and down with it is an elbow lever $o'$ $p'$, which has its fulcrum at $q'$. The short arm, $o'$, of this lever slides against the inner edge of the parallel bar $m'$, or the long arm $p'$ is loaded with a weight $r'$, and is supported by a spring. On the fulcrum pin, $q'$, of said elbow lever is mounted a small roller, $s'$, and at a suitable point on the bar $m'$, is an inclined projection, $t'$, which comes in contact with the roller, $s'$, in case the cutters descend too far. A rod, $d'$, is attached at its upper end to the cross-head I, its lower end passing loosely through an eye in the lever $r$, on which is a screw thread and nut $c'$; this nut may be screwed up and down on the rod $d'$, and serves to shorten or lengthen the stroke of the piston; when the cutters rise by the action of the steam on the under side of the piston, the nut $e'$ comes in contact with the lever $r$, raises the steam valve in the valve chest $n'$, thus closing the induction and opening the exhaust port; the stop pawl, $j'$, is drawn under the nose $i'$, by the bar $m'$, thus holding the valve in this position while the piston, cross-head, and cutter bar descend by their own gravity. As soon as the cutters strike the rock, the momentum of the weight $r'$ on the elbow lever $o'$ $p'$ causes the short arm $o'$ of said lever to press back the parallel bar $m'$, and stop pawl $j'$, releasing the bar $g'$ and lever $r$, and permitting the piston in the small cylinder $p$ to force down the steam valve in the valve chest $n$, thus readmitting steam to the under side of the piston in the cylinder $m$, and repeating the operation. In case the cutters do not strike the rock before the piston has descended so far as to endanger its striking the lower cylinder head, the roller $s'$ will come in contact with the inclined projection $t'$, and force back the bar $m'$ and pawl $j^1$, thus readmit the steam under the piston and prevent its descending too far. The height to which the piston and cutter bar is permitted to rise is regulated by the nut $e'$ at the lower end of the rod $d'$; if the nut is screwed up the stroke is shortened, and if the nut is screwed down the stroke is lengthened. By means of this arrangement the force of the blow given by the cutters can be regulated at pleasure. A feed movement is imparted to the whole apparatus by the rod, $s$, which receives motion from the end of the lever $r$, and connects with an arm, $t$, which is mounted on the end of the rock-shaft $u$; said rock-shaft has its bearings in the truck frame A, and an arm, $v$, mounted on its opposite end connects with a slide, $w$, to which a reversible pawl, $x$, is attached, which serves to impart motion to the feed wheel $y$. This feed wheel is mounted on an upright shaft $a'$, which has its bearings in suitable boxes secured to the truck frame, and to the lower end of which a pinion, $b'$, is firmly secured; this gears into a toothed rack, $c'$, attached to one of the rails which constitute the truck G.

The reversible pawl, x, may be changed so as to feed either forward or backward over the rock to be channelled. When it is desired to feed the machine in the direction of the arrow 1, fig. 3, the wheel, B*, is raised up on the truck frame A; this causes the standard H, cutter bar K, and all its appliances to incline to the left, consequently the left hand or rear cutters of the gang of cutters J will cut into the rock a little deeper than the forward cutters; were they not so arranged, the forward cutters would have to perform nearly all the cutting, whereas in this arrangement the work is equally distributed over all the cutters. The degree of inclination given to them should be regulated by the amount of feed imparted to the truck frame at each stroke and by the hardness of the rock to be cut. The cutters J have their cutting edges at unequal distances from each other; this variation need only be slight to effect the desired object, namely, to cause them to cut the bottom of the channel smooth and even, and it is preferable to have the variation irregular. By this arrangement a channel of any desired depth can be cut in a comparatively short time and with little trouble or labor. It can be cut in an inclined or a vertical direction, and the whole mechanism is compact and easily adjusted.

We do not claim arranging the guides for the cutters of a stone-channelling machine so that they can be inclined laterally for the purpose of cutting a channel in an inclined direction, as this has been done before; neither do we claim the use of a gang or series of reciprocating cutters; but we do claim as our invention, and desire to secure by Letters Patent—

1. A stone-channelling machine composed of a gang of cutters in combination with the direct-acting steam cylinder, the automatic valve gear, and provided with a suitable truck frame, upon which the boiler and whole apparatus is mounted, constructed and operating substantially as described and for the purpose specified.

2. The adjustable cross-piece $h$, and feed screw $j$, in combination with the cutter bar K, and cross-head I, substantially as described, and for the purpose set forth.

3. Operating the feed wheel $y$ from the cross-head I, by means of the rod $d'$, lever $r$, rod $s$, and rock-shaft $u$, or their equivalents, operating substantially in the manner described.

4. A swinging frame, operating a gang of cutters in a stone-channelling machine, in a position inclined to the direction of the cut, in such manner that both the rear cutters of the gang will cut deeper than the forward cutter.

5. Mounting the wheels B* and B' on adjustable brackets, substantially as and for the purpose described.

6. The method herein described of changing the valve of the steam cylinder by the concussion of the cutters in striking the rock, consisting of the elbow $o'$ $p'$, parallel bar $m$, stop pawl $j$, rod $g'$, lever $r$, and valve-rod $q$, or other equivalent means of producing the same effect.

7. The method herein described of changing the valves of the steam cylinder, when the cutters do not strike the rock, consisting of the roller or stud $s'$, inclined projection $t'$, pawl $j'$, rod $g'$, lever $r$, and valve rod $q$, or other equivalent means of producing the same effect.

8. The adjustable rod $d'$ and the lever $r$, in combination with the cutter bar $k$, cross-head I, valve rod $q$, and feed slide $w$, constructed and operating substantially as and for the purpose set forth.

THOMAS ROSS,
ANDREWS T. MERRIMAN.

Witnesses for Thomas Ross:
   H. S. FOOT,
   JUSTUS COBB.
Witnesses for A. T. Merriman:
   S. M. DORR,
   R. BARRETT.